(12) United States Patent
Niimura

(10) Patent No.: US 9,169,916 B2
(45) Date of Patent: Oct. 27, 2015

(54) POWER TAKEOFF UNIT FOR AUTOMOBILE

(75) Inventor: Satoshi Niimura, Tochigi (JP)

(73) Assignee: GKN Driveline Japan Ltd., Tochigi (JP)

( * ) Notice: Subject to any disclaimer, the term of this patent is extended or adjusted under 35 U.S.C. 154(b) by 264 days.

(21) Appl. No.: 13/559,526

(22) Filed: Jul. 26, 2012

(65) Prior Publication Data

US 2012/0285276 A1   Nov. 15, 2012

Related U.S. Application Data

(63) Continuation-in-part of application No. PCT/JP2011/051716, filed on Jan. 28, 2011.

(30) Foreign Application Priority Data

Jan. 29, 2010   (JP) .................................. 2010-018073

(51) Int. Cl.
*F16H 57/029* (2012.01)
*B60K 17/344* (2006.01)
*F16H 57/038* (2012.01)
*F16H 57/037* (2012.01)

(52) U.S. Cl.
CPC ............ *F16H 57/029* (2013.01); *B60K 17/344* (2013.01); *F16H 57/038* (2013.01); *F16H 57/037* (2013.01)

(58) Field of Classification Search
CPC ........................... B60K 23/0808; F16H 57/029
USPC .......................... 74/15.82, 15.86, 11; 180/248
See application file for complete search history.

(56) References Cited

U.S. PATENT DOCUMENTS

| | | | | |
|---|---|---|---|---|
| 3,869,940 A | * | 3/1975 | Webb et al. ...................... | 475/85 |
| 4,476,953 A | * | 10/1984 | Hiraiwa ......................... | 180/249 |
| 4,601,359 A | * | 7/1986 | Weismann et al. ............ | 180/233 |
| 4,739,478 A | * | 4/1988 | Roberts et al. .............. | 705/36 R |
| 4,739,678 A | | 4/1988 | Miura et al. | |

(Continued)

FOREIGN PATENT DOCUMENTS

| | | |
|---|---|---|
| JP | 61-140672 A | 6/1986 |
| JP | 62-059132 A | 3/1987 |

(Continued)

OTHER PUBLICATIONS

Notice of Rejection Reasons, mailed Sep. 4, 2013, for Japanese Patent Application No. 2011-551925, with English translation, six pages.

(Continued)

*Primary Examiner* — James English
(74) *Attorney, Agent, or Firm* — Bejin Bieneman PLC

(57) ABSTRACT

A power takeoff unit for an automobile combined with a transmission is comprised of a first rotatable shaft including a first gear; a second rotatable shaft including a second gear, the second shaft being so disposed as to have the second gear engaged with the first gear and intersecting with, or being not parallel and not intersecting with, the first shaft to establish driving link between the first shaft and the second shaft; a casing including an attachment portion having a first internal face having a first internal diameter and an end portion and a second internal face being disposed inward than the first internal face relative to the casing and having a second internal diameter; and a seal member interposed between the first shaft and the second internal face.

7 Claims, 8 Drawing Sheets

(56) References Cited

U.S. PATENT DOCUMENTS

| | | | | |
|---|---|---|---|---|
| 4,763,749 | A | * | 8/1988 | Miura et al. .................. 180/249 |
| 4,909,345 | A | * | 3/1990 | Iwatsuki et al. .............. 180/250 |
| 4,911,260 | A | * | 3/1990 | Miura et al. .................. 180/249 |
| 4,912,639 | A | * | 3/1990 | Kawamoto et al. ............. 701/69 |
| 5,071,396 | A | * | 12/1991 | Kobayashi .................... 475/249 |
| 5,951,430 | A | * | 9/1999 | Kobayashi .................... 475/221 |
| 7,278,943 | B2 | * | 10/2007 | Puiu .............................. 475/86 |
| 7,878,936 | B2 | * | 2/2011 | Nett et al. .................... 475/223 |
| 8,256,559 | B2 | * | 9/2012 | Kato et al. .................... 180/248 |
| 8,657,073 | B2 | * | 2/2014 | Matsumoto et al. .......... 184/11.1 |
| 2006/0011001 | A1 | * | 1/2006 | Showalter ........................ 74/23 |
| 2006/0150759 | A1 | * | 7/2006 | Gitt ................................ 74/330 |
| 2008/0283351 | A1 | * | 11/2008 | Sasaki et al. .................... 192/20 |
| 2008/0314675 | A1 | * | 12/2008 | Nozaki et al. ................. 180/305 |

FOREIGN PATENT DOCUMENTS

| | | |
|---|---|---|
| JP | 05-155265 A | 6/1993 |
| JP | 2002-172945 A | 6/2002 |
| JP | 2004-231070 A | 8/2004 |
| JP | 2004-314796 A | 11/2004 |
| JP | 2008-110748 A | 5/2008 |
| JP | 2009-115309 A | 5/2009 |

OTHER PUBLICATIONS

International Search Report mailed Apr. 12, 2011, for PCT Application No. PCT/JP2011/051716, with English Translation, five pages.

* cited by examiner

POWER TAKEOFF UNIT FOR AUTOMOBILE

CROSS-REFERENCE TO RELATED APPLICATIONS

This application is a continuation-in-part Application of PCT International Application No. PCT/JP2011/051716 (filed Jan. 28, 2011), which is in turn based upon and claims the benefit of priority from Japanese Patent Application No. 2010-018073 (filed Jan. 29, 2010), the entire contents of which are incorporated herein by reference.

BACKGROUND OF THE INVENTION

1. Field of the Invention

The present invention relates to a power transmission device of an automobile, and in particular relates to a power takeoff unit for distributing torque from first axles to second axles in a four-wheel drive vehicle for example.

2. Description of the Related Art

In a front-wheel drive vehicle for example, an engine installed on the front of a vehicle body generates torque and a differential receives and distributes the torque to left and right front wheels. In a case of a four-wheel drive vehicle, for the purpose of distributing part of torque to rear wheels, a power takeoff unit (PTU) is in general used in combination with a transmission including a differential. A casing of the PTU and a transmission case are mutually securely combined in order to prevent eccentricity of these rotation shafts and then used.

Oil is required to circulate throughout the interior of the transmission case for the purpose of lubrication. Separate from this circulation, another oil is required to circulate within the PTU. To prevent mutual mixing, an oil seal is in general disposed at the boundary between the transmission case and the PTU. This oil seal is required to intervene there with sufficient repulsive force in order to prevent oil leakage through the periphery of the rotation shaft. Thus, in a case where the oil seal is disposed within the PTU at the side opposed to the casing, the oil seal is, after assembly of the PTU, pressed from its end into the PTU around the periphery of the rotation shaft with considerably great pressure.

Japanese Patent Applications Laid-open No. 2004-314796, 2009-115309, U.S. Pat. No. 4,739,678 A, and Japanese Patent Application Laid-open No. 5-155265 disclose related arts.

SUMMARY OF THE INVENTION

In accordance with the art disclosed in U.S. Pat. No. 4,739,678 A for example, the oil seal may be disposed not at the boundary between the PTU and the transmission case but at an inner location in the PTU. Considering a disposition of the oil seal and a bearing, however, a ring gear must be installed from an end of the shaft opposite to the boundary. Further considering a thrust force acting on this ring gear, a bearing directly supporting the ring gear is required. Because this bearing cannot contribute to retaining an axis of the shaft in place, only one bearing disposed closer to the boundary, which has a reduced diameter, retains the axis of the shaft in place. The present inventors have discovered a source of a problem of eccentric motion or precession of the shaft in this layout.

The present invention has been achieved in view of the aforementioned problems and is intended to provide a power takeoff unit that solves puzzle-like problems about a layout of oil seals, bearings, and gears in the PTU.

According to an aspect of the present invention, a power takeoff unit for an automobile combined with a transmission is comprised of: a first rotatable shaft of a single unitary body having a first end combinable with the transmission and a second end, the second end an output shaft of the transmission being led out of; a first gear as a body separate from the first shaft, the first gear fitting on and being unitarily rotatable with the first shaft and having gear teeth facing the first end; a first bearing closer to the first end than the first gear and a second bearing closer to the second end than the first gear, the first bearing and the second bearing fitting directly on the first shaft; a second rotatable shaft including a second gear, the second shaft being so disposed as to have the second gear engaged with the first gear and intersecting with, or being not parallel and not intersecting with, the first shaft to establish driving link between the first shaft and the second shaft; a casing housing the first gear, the first shaft, the second gear and the second shaft, the casing being configured to link with the transmission and including an attachment portion having a first internal face having a first internal diameter and an end portion, and a second internal face being disposed inward than the first internal face relative to the casing and having a second internal diameter; and a seal member configured to keep oil within the casing and interposed between the first shaft and the second internal face.

DETAILED DESCRIPTION OF THE PREFERRED EMBODIMENT

Exemplary embodiments of the present invention will be described hereinafter with reference to FIGS. 1 through 8.

Figure 1:
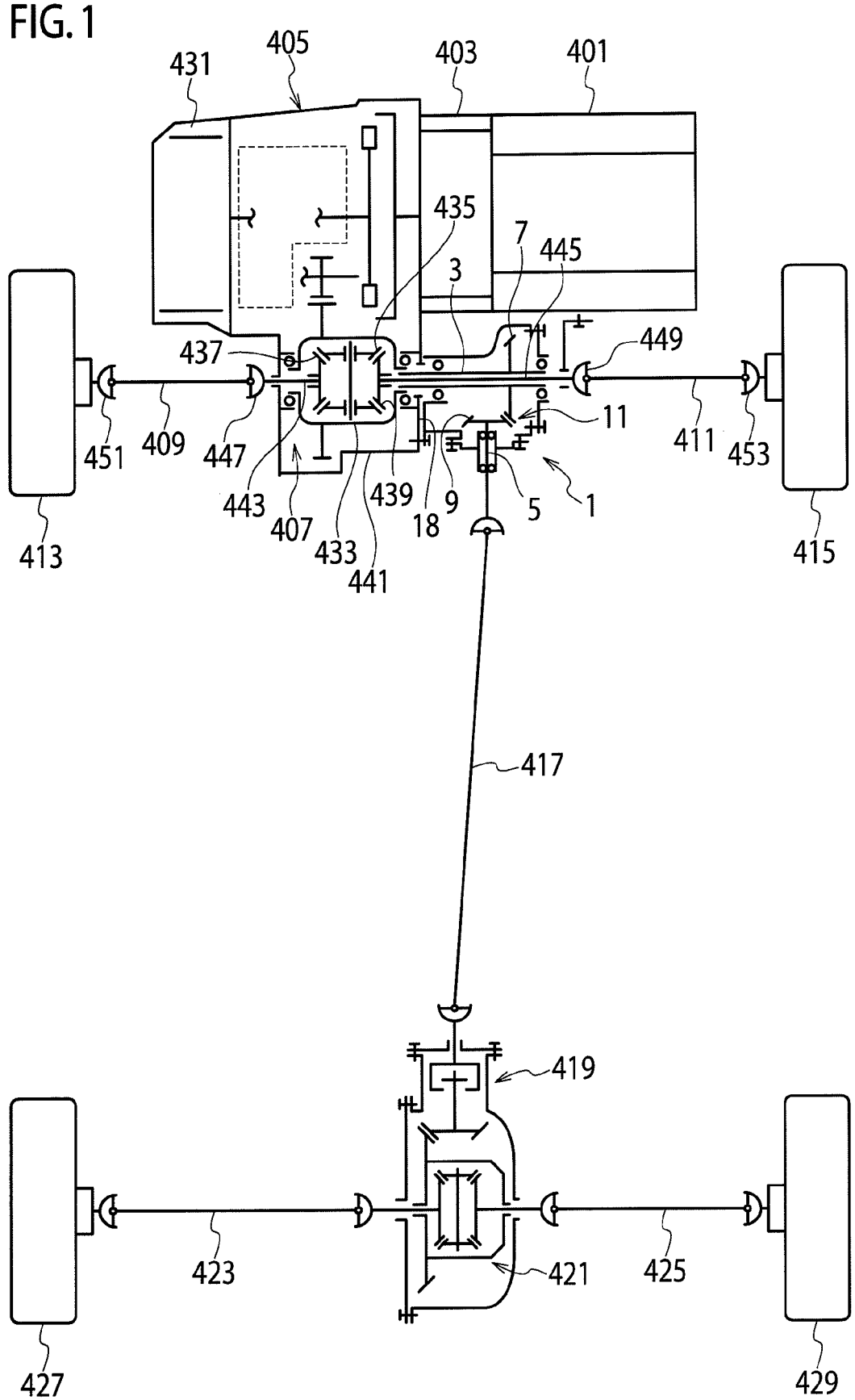
FIG. 1 is a drawing schematically depicting a power system of an automobile.

Referring to FIG. 1, a power system of an automobile is, as an example, comprised of an engine 401 and/or an electric motor 403, and a transmission 405 on the front of the vehicle body. The transmission 405 is comprised of a front differential 407 to receive torque from the engine 401 and/or the electric motor 403 and distribute the torque via the front differential 407 to left and right output shafts 443,445. The output shafts 443,445 are combined with axles 409,411 via constant-velocity joints 447,449, which are further combined with front wheels 413,415 via constant-velocity joints 451, 453, thereby driving the front wheels 413,415. To the transmission 405, a generator 431 may be coupled.

The front differential 407 is comprised of a differential gear set, and thereby transmits torque input into the differential case 433 to the output shafts 443,445 with permitting differential motion therebetween. A combination of a pinion 435 and side gears 437,439 meshing therewith can be exemplified as the differential gear set, but any of the other types may be used.

In the example shown therein, namely a four-wheel drive automobile, a rear differential 421 is installed on the rear of the vehicle body and is coupled with rear wheels 427,429 via axles 423,425, thereby permitting differential motion between the rear wheels. For the purpose of transmission of part of the torque, a power takeoff unit (PTU) 1 is provided. The present invention is preferably applied to the PTU 1.

The PTU 1 receives part of the torque from the transmission 405 via a first shaft (input shaft) 3 drivingly coupled with the differential case 433 and transmits it to a second shaft (output shaft) 5. The second shaft 5 is coupled with the rear differential 421 via a constant-velocity joint and a propeller shaft 417. If necessary, a coupling 419 is provided so as to intermissively transmit the torque to the rear differential 421.

First Embodiment

With reference to FIGS. 2 through 5, a PTU 1 according to a first embodiment will be described hereinafter.

Figure 2:
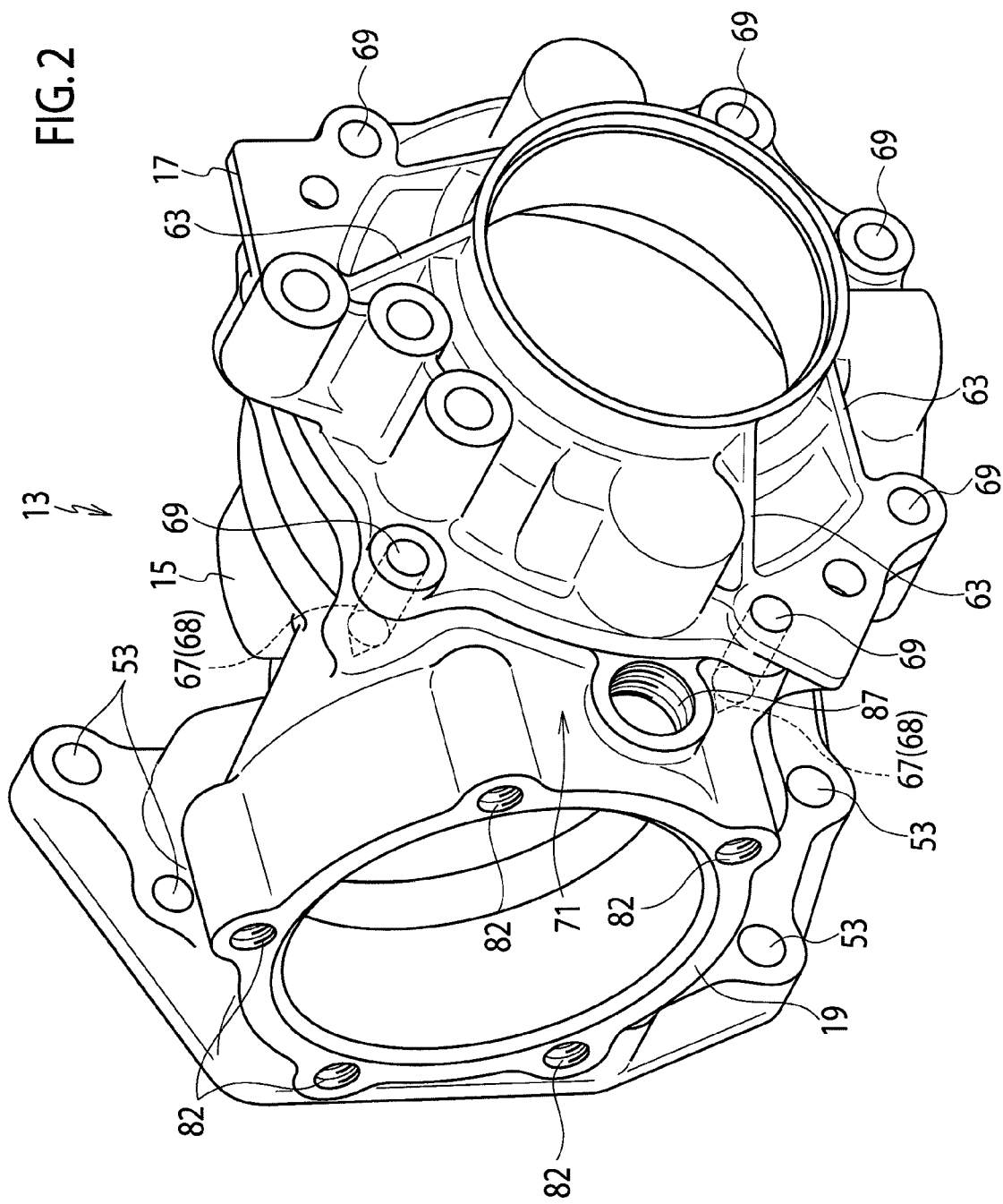
FIG. 2 is an elevational perspective view of a casing of a power takeoff unit according to a first embodiment of the present invention.
Figure 3:
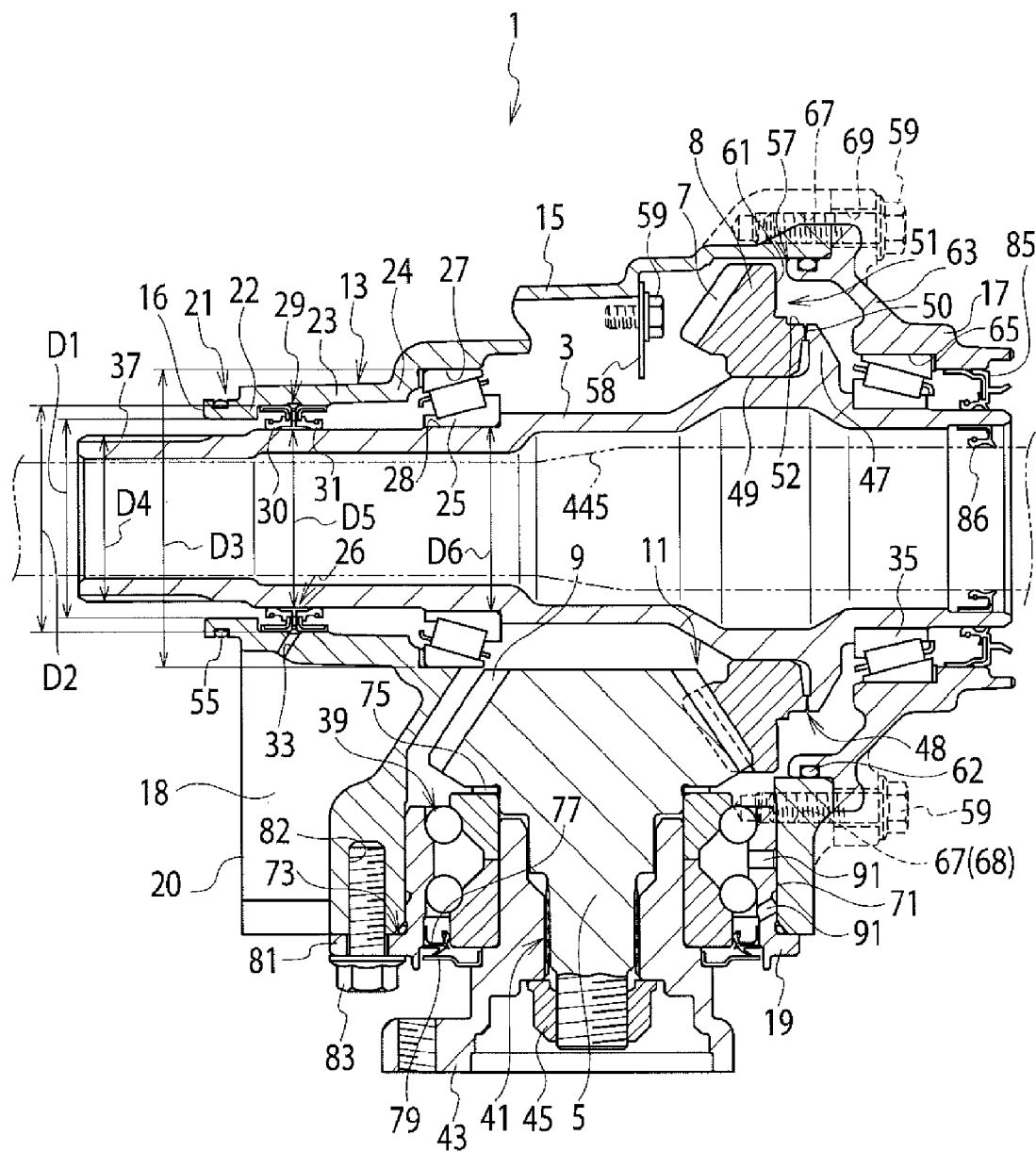
FIG. 3 is a cross sectional view of the power takeoff unit.
Figure 5:
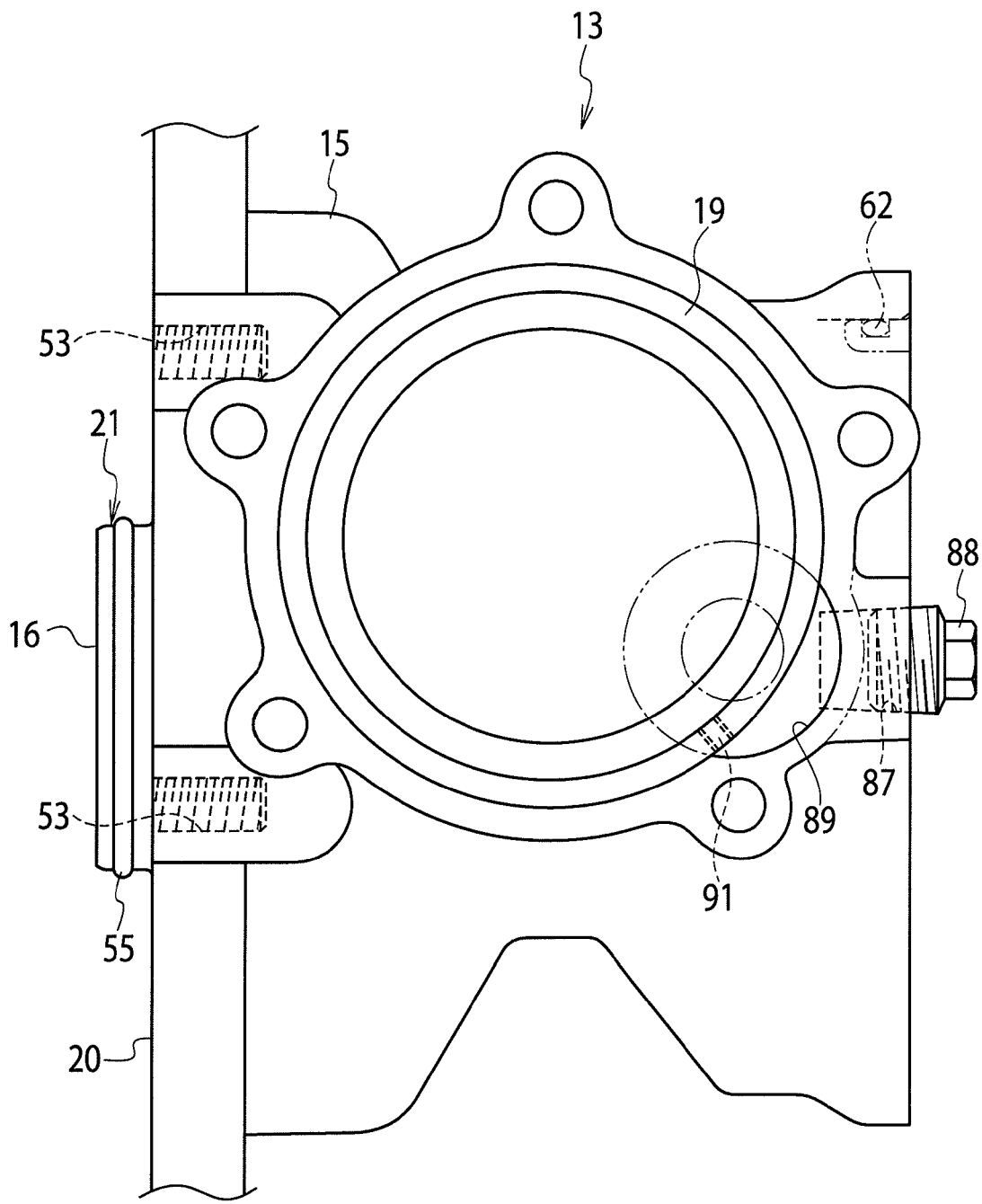
FIG. 5 is a plan view of the casing of the power takeoff unit according to the first embodiment, viewed from the side of a second shaft.

Mainly referring to FIG. 3, the PTU 1 is comprised of a first shaft 3 combined with the differential case 433 to receive torque therefrom, a first gear 7 rotating unitarily with the first shaft 3, a second shaft 5 for output, and a second gear 9 rotating unitarily therewith. The first shaft 3 and the second shaft 5 mutually intersect substantially at a right angle, or are in a relationship of so-called skew axes where the axes are not parallel and not intersecting, and have the second gear 9 engaged with the first gear 7. FIGS. 2 and 5 illustrate a casing adapted for a case of skew gearing. A gear set 11 of the gears 7,9 transmits the torque input into the first shaft 3 to the second shaft 5.

The PTU 1 is comprised of a casing 13 for housing the first shaft 3, the second gear 9 and the second shaft 5. Referring to FIG. 2, the casing 13 is constituted of a main body 15 and a covering body 17. The covering body 17 is preferably comprised of a fitting portion 57 projecting inward relative to the main body 15 so as to fit with the main body 15. The main body 15 and the covering body 17 are comprised of a plurality of corresponding bolt holes 67 and 69, thereby being mutually secured by means of bolts. The first shaft 3 and its accompanying members will be installed into the casing 13 in a state where the covering 17 is detached.

The main body 15 is comprised of a plurality of bolts holes 53 for being secured with a case 441 of the transmission 405. Referring to FIG. 3, at a mounting face 20 at the left of the drawing, the casing 13 comes in close contact with and is fixed with the case 441 of the transmission 405, thereby the PTU 1 is drivingly coupled with the differential 407.

Returning to FIG. 2, the main body 15 is opened toward the left and lower side of the drawing so as to receive the second shaft 5 and is comprised of a support portion 71 and a plurality of bolt holes 82 around which a support body 19 for supporting the second shaft 5 is attached.

The interior of the PTU 1 is lubricated by oil and comprised of a plurality of proper seal members for keeping the oil within the casing 13. Referring to FIG. 3, these seal members at least include a seal member 29 provided near the left end and around the first shaft 3, a seal member 85 near the right end and around the first shaft 3, an O-ring 62 interposed between the main body 15 and the covering body 17, and a seal 77 provided around the second shaft 5. The O-ring 62 is preferably provided around the outer periphery of the fitting portion 57. If necessary, any seal members such as O-ring or gaskets may be provided at other locations.

The casing 13 is, at the left end in FIG. 3, comprised of an attachment portion 21 for fitting with the transmission case 441. The attachment portion 21 is so dimensioned as to fit into the transmission case 441 to align the first shaft 3 with the shaft of the transmission 405. Fixation with the transmission case 441 may rely on the mounting face 20 and therefore any fixation means can be omitted from the attachment portion 21. An outer peripheral face of the attachment portion 21 is preferably comprised of a groove for housing an O-ring and then an O-ring 55 is provided within the groove.

The part of the casing 13 for housing the first shaft in general becomes stepwise smaller in diameter toward the attachment portion 21. The internal face of the casing 13, at the attachment portion 21, has an internal diameter D1 and, at a position further inward than the attachment portion 21, has an internal diameter D2, which is larger than the internal diameter D1. A flexure 22 links these portions. At the cylindrical portion 23 having the internal face of the internal diameter D2, the seal member 29 is supported. As the seal member 29 intervenes between the first shaft 3 and the casing 13, the oil is kept within the casing 13. Preferably the seal member 29 is made close to the end portion 16 to abut on the flexure 22, thereby being axially put in place.

An internal diameter D3 of the casing 13 at the part further inward relative to the casing 13 than the part supporting the seal member 29 is further greater than the internal diameter D2 and a support portion 27 there supports a bearing 25. A flexure 24 links these portions. Preferably the bearing 25 is made to abut on the flexure 24, thereby being axially put in place.

Figure 4:
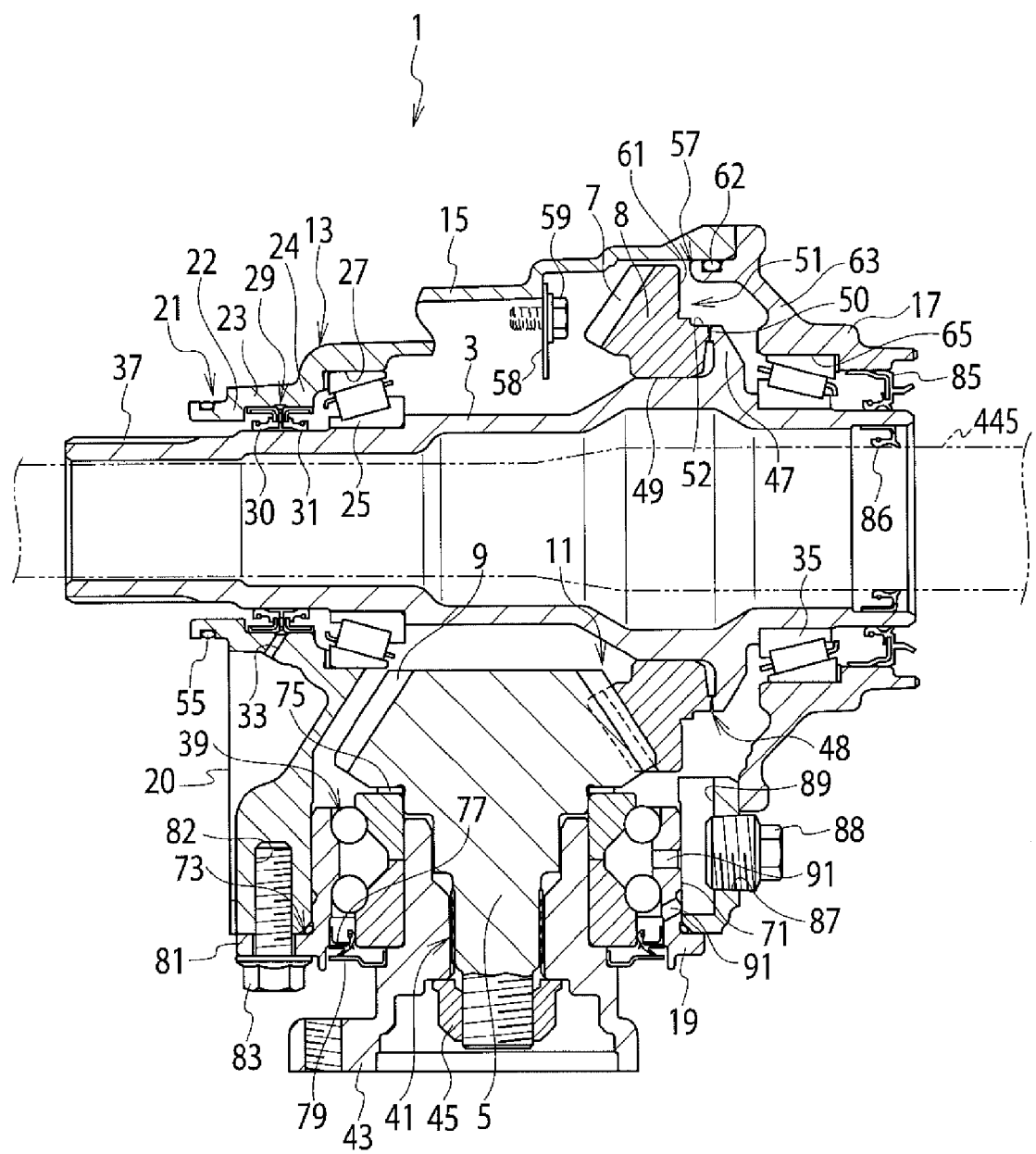
FIG. 4 is a cross sectional view of a power takeoff unit according to a modified embodiment.

As shown in FIG. 4, it may be occur that the flexures 24 and 22 are made very close to each other to shorten the cylindrical portion 23 and location of the attachment face 20 is correspondingly changed, thereby shortening the first shaft 3.

The seal member 29 may be a combination of a first seal member 30 and a second seal member 31. The first seal member 30 may be placed adjacent to, or separated from, the second seal member 31. Any of the seal members 30,31 may be disposed at the boundary toward the transmission 405, or inside the transmission 405. Further, as being opened in between the first seal member 30 and the second seal member 31, an opening 33 communicating the exterior with the interior of the casing 13 may be provided. After securing the casing 13 with the transmission case 441, the opening 33 communicates with a small gap 18 held therebetween, thereby functioning as an air vent. As pressure fluctuation between the seal members 30,31 is mitigated, this contributes improvement of the sealing performance.

To regulate internal pressure in the casing 13, a breather may be provided. Further, to protect the breather, a baffle plate 58 may be secured in the casing 13 by means of a bolt 59.

The covering body 17 is comprised of a support portion 65 for bearing the first shaft 3. To reinforce and stiffen the support portion 65, a plurality of ribs 63 is preferably provided. The ribs 63 are, as shown in FIG. 2, formed in a slanted shape spanning the fitting portion 57 and the support portion 65. To provide the ribs 63 enables size reduction of the support portion 65.

The first shaft 3 is, as shown in FIGS. 3 and 4, preferably a single unitary body and is hollow so as to allow passage of the output shaft 445 led out of the differential 407. The output shaft 445 is led rightward out of the end at the right in the drawing. To prevent leakage of oil through the periphery of the output shaft 445, a seal member 86 is preferably provided within the first shaft 3.

Part around the end of the first shaft 3 at the left in the drawings is comprised of a splined connection portion 37, and is thereby drivingly coupled with the differential case 433 to receive torque therefrom. The connection portion 37 preferably projects axially outward from the end portion 16.

The part of the first shaft 3 at the left in the drawings preferably becomes stepwise smaller in diameter toward the left. At the connection portion 37, its external diameter is preferably made to be minimum, D4. At a cylindrical portion 26 that slides on the seal member 29, its external diameter is preferably made to be D5, which is identical to or larger than D4. At a portion 28 that abuts on the bearing 25, its external diameter is preferably made to be D6, which is identical to or larger than D5. Further, part of the first shaft 3, on which the first gear 7 is seated, is larger than any of them. Part of the first shaft 3 at the right relative to the first gear 7 preferably also has a structure becoming smaller in diameter toward the right, and part on which the seal member 85 is seated is smaller in diameter than part on which the bearing 35 is seated.

Such a relation among the internal diameters D1-D3 and the external diameters D4-D6 facilitates work for installing the first shaft 3 into the casing 13.

The first gear 7 has an annular base portion 8 on which gear teeth are formed. The first gear 7 with its gear teeth facing the left end (the end of the first shaft 3 for combining with the shaft of the transmission 405) fits around the first shaft 3, preferably by means of press fitting from the left end, thereby unitarily rotating therewith. As the part on which the first gear 7 is seated is larger than any of the outer diameters D4-D6, any part of the first shaft 3 does not interfere with the internal periphery of the first gear 7 in the course of the press fitting. Further, as the gear teeth faces the left end, the second gear 9 meshing therewith is disposed closer to the left end. This is beneficial in bringing the propeller shaft 417 closer to the center of the vehicle body.

The first shaft 3 is preferably comprised of a flange 47 on which the first gear 7, at its bottom portion 52 standing from its back face 51, abuts. The flange 47, from the side opposite to the gear teeth relative to the base portion 8, more specifically in a direction resisting a rightward thrust load acting on the first gear 7, abuts on the first gear 7. The flange 47 may be comprised of an abutment portion 48 as abutting on the bottom portion 52, and may be joined there by means of welding. Fixation by welding is advantageous in size reduction of the PTU. Alternatively, fixation only by press fitting, or fixation by tightening means or splines, may be applicable if possible.

The bearing 25 is, from the left end of the first shaft 3 (the end for combining with the shaft of the transmission 405), pressed therein and then seated on the portion 28. The outer diameter D6 of the portion 28, as being larger than the outer diameters D5 and D4, does not damage the cylindrical portion 26 in the course of the press fitting, thereby not deteriorating the sealing function of the sealing member 29. Similarly, the bearing 35 is, from the right end of the first shaft 3 (the end of which the output shaft 445 is led out), pressed therein and then seated on the first shaft 3 at the right side relative to a flange 47 described later. The peripheral surface on which the seal member 85 is seated is prevented from being damaged. Both the bearings 25 and 35 fit directly on the first shaft 3.

The bearing 25 is, as described above, born by the support portion 27 of the casing main body 15, and a bearing 35 is born by the support portion 65 of the covering body 17. The first shaft 3 is rotatably born by the bearing 25 and the bearing 35. To the bearing 25 and the bearing 35 applicable are various types of bearings, such as conical roller bearings or ball bearings.

As being understood from the above description, by both the bearing 25 closer to the left end than the first gear 7 and the bearing 35 closer to the right end than the first gear 7, the first shaft 3 is supported. Therefore the eccentric motion or the precession will not happen to the first shaft 3. The radial load and the thrust load generated by engagement of the first gear 7 and the second gear 9 can be of course born by these bearings 25 and 35.

Although the back face 51 is drawn to be a plane perpendicular to the axis in the drawings, it may be an inclined plane or a curved surface instead. The back face 51 is preferably made to fall back leftward relative to a contact face 50 between the abutment portion 48 and the bottom portion 52. This is advantageous in reducing the axial size of the casing 13.

The contact face 50 is radially inward from, and axially opposed to, the fitting portion 57 between the casing main body 15 and the covering body 17. A contact face 49 between the first shaft 3 and the first gear 7 is also preferably radially inward from the fitting portion 57. Such disposition is advantageous in reduction of the casing 13 in radial size and/or axial size.

The second shaft 5 is, as described above, disposed as to be substantially perpendicular to, or in a skew relation relative to, the first shaft 3. The second shaft 5 is preferably unitarily, or as a separate body in any case, comprised of the second gear 9, which engages with the first gear 7. The first gear 7 and the second gear 9 constitute the gear set 11 of a so-called bevel gear or hypoid gear type. Through the gear set 11, torque is transmitted from the first shaft 3 to the second shaft 5 and its rotation direction is changed.

The second shaft 5 is comprised of a splined connection portion 41 to which the output member 43 is so coupled as to unitarily rotate. The output member 43 is so configured as to link with the propeller shaft 417, thereby transmitting torque to the rear wheels.

The second shaft 5 is rotatably born by the casing 13 via a bearing 39 and the support body 19 interposed therebetween. The support body 19 is comprised of a flange portion 81, which is expanded outward at its lowermost end. The flange portion 81 is interposed between bolts 83 and the support portion 71 so as to assure fixation of the support body 19. Although the support body 19 is in FIGS. 3 and 4 drawn as an outer race on which balls of the bearing 39 roll, the outer race and the support body 19 may be separate bodies instead. The support body 19 may directly abut on the support body 71, or any other member may be interposed therebetween.

To the bearing 39 applicable is a ball bearing of a double angular type, whereas a bearing of any other type such as a ball bearing of any other type or a conical roller bearing may be instead applicable.

A fixation member 45 is provided for the purpose of fixing relative location in the axial direction between the second shaft 5 and the output member 43. Either the second shaft 5 or the output member 43 may be threaded to allow regulation of relative location in the axial direction by loosening or tightening them. Further to regulate meshing of the gear set 11, any proper shim 75 is made interposed between the bearing 39 and the second gear 9.

The seal 77 is preferably disposed at any proper location outward relative to the bearing 39. To prevent intrusion of dust or muddy water, a dust cover 79 may be provided so as to abut on the seal 77.

On the side of the support portion 71, or at any proper location on the casing 13, a filler hole 87 is provided. The oil is, after assembly of the PTU 1 is finished, put into the casing 13 through the filler hole 87. For the purpose of facilitating oil circulation, an oil groove 89 is preferably provided around the filler hole 87 in the casing 13. Further preferably, an oil hole 91 is provided on the support body 19 so as to communicate with the oil groove 89. The oil hole 91 establishes fluid communication between the oil groove 89 and the interior of the outer race. The filler hole 87 is closed with a plug 88.

The PTU 1 is in general assembled in a way as described below. The seal member 29 is, unlike the prior art, inserted not through the side of the attachment portion 21 but through the opening at the opposite side. The seal member 29 is positioned at the cylindrical portion 23 of the internal diameter D2, and next the outer race of the bearing 25 is positioned at the support portion 27 of the internal diameter D3. As D2 is smaller than D3, insertion of the seal member 29 is not prevented. The first gear 7 is fit on the first shaft 3 from its left end and then secured, and next the rolling body and the inner race of the bearing 25 are pressed onto the first shaft 3. The first shaft 3, along with the rolling body of the bearing 25, the inner race and the first gear 7, is inserted into the casing main body 15, and is further inserted so as to penetrate the bearing 25 and the seal member 29. As the first shaft 3 becomes stepwise smaller in the order of the external diameters D6, D5, D4, this insertion is not prevented. Moreover, as the seal member 29 and the bearing 25 are put in place by abutting on the flexures 22 and 24, these members are prevented from falling into false locations in the course of these steps.

Next the covering body 17, along with the bearing 35 and the seal members 85 and 86, is installed onto the main body 15, and bolts 59 are tightened thereon, thereby these members are mutually fixed. In this way, installation of the first shaft 3 into the casing 13 is generally completed.

The second shaft 5, along with the bearing 39, is inserted into the opening of the casing main body 15. To regulate meshing between the first gear 7 and the second gear 9, any proper shim 75 is inserted therein. When meshing becomes proper, the bolts 83 are tightened to axially fix the second shaft 5.

In the aforementioned way, assembly of the PTU 1 is generally completed.

Part of the casing 13, which houses the first shaft, becomes stepwise smaller in diameter toward the attachment portion 21. The internal diameter of the attachment portion 21 is, unlike the prior art, not required to have any measures to receive insertion of the seal member 29. More specifically, as the internal diameter D1 can be made smaller than D2, the attachment portion 21 can be considerably small in diameter. The attachment portion 21 of such a small size contributes to increase freedom of dimensions and freedom of design of the transmission case 441.

While it may be improper to press the seal member 29 from the side of the attachment portion 21 into the casing 13, the seal member 29 can be nevertheless disposed very close to the attachment portion 21. One can readily and visually, from the side of the attachment portion 21, check whether the seal member 29 is attached in place or not. Moreover, the oil in the transmission 405 readily reaches the seal member 29 and then lubricates the part around the seal member 29.

As the first shaft 3 becomes stepwise smaller toward the connection portion 37, it can be readily carried out to install it into the casing 13 and interpose the seal member 29 and the bearing 25 between the first shaft 3 and the casing 13. Any special measures in light of design are not required to facilitate installation. Thus freedom of design and freedom of choice are ensured in regard to each component.

The seal member 29 as well as the cylindrical portion 23 sliding thereon can be made smaller in diameter than corresponding components or parts of the prior art. Circumferential velocity of the seal member 29 relative to the cylindrical portion 23 is also made lower. Therefore deterioration of the seal member 29 is suppressed. This fact is advantageous in lifetime extension of the seal member 29.

Existence of stepped diameter reduction of the casing 13 and the flexures 22 and 24 contribute to increase in strength and stiffness of the casing 13 and are therefore advantageous in size reduction of the casing 13. They are further advantageous in positioning the seal member 29 and the bearing 25.

The PTU 1 can by itself retain the oil therein by using a plurality of seal members including the seal member 29, the seal member 85, the O-ring 62, and the seal 77. As compared with a case where a PTU cannot retain oil if not combined with a transmission, the PTU 1 facilitates its production process and its handling.

By means of the hole 33, the gap 18 between the casing 13 and the transmission case 441 spatially communicates with the interior of the casing 13, thereby relieving pressure fluctuation. Thus the PTU 1 displays excellent performance in oil sealing.

Meanwhile, as being understood by comparing the example shown in FIG. 3 and the modified example shown in FIG. 4, the present embodiment permits freely changing the length of the attachment portion 21, the length of the cylindrical portion 23, and the location of the attachment portion 20 as need arises. Further, even when these parameters are changed, any changes on other components are unnecessary and any effects will not be reduced as well. Also in this point, freedom of design is ensured. Any PTU in accordance with the present embodiment can be applied to any of numerous types of transmissions if the seal members 29, the bearings 25, the first gears 3 and such are, as common parts, kept in stock, and the attachment portions 21, the cylindrical portions 23, the attachment portions 20, and casings with some varieties of lengths and dimensions are kept in stock.

Second Embodiment

Figure 6:
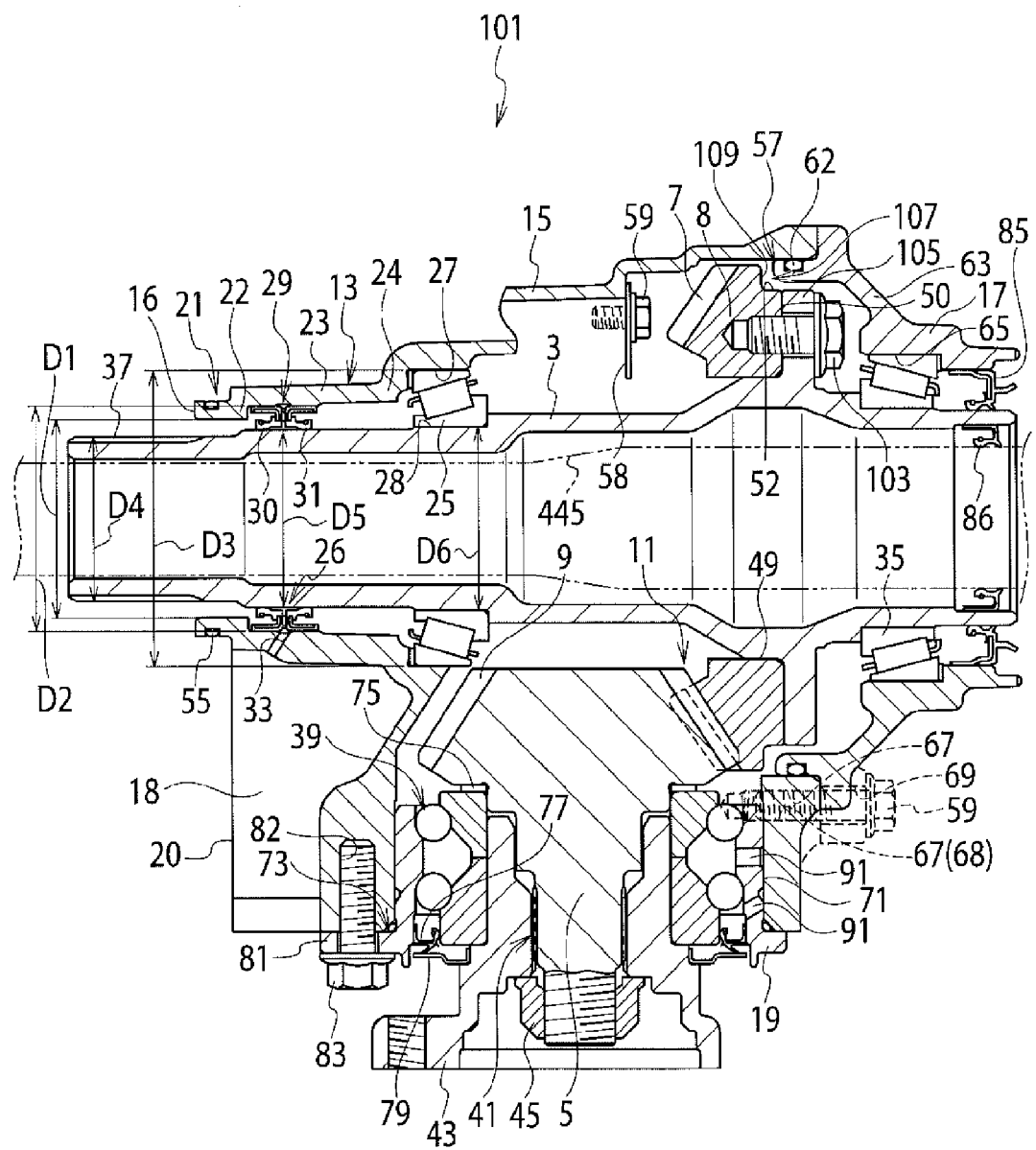
FIG. 6 is a cross sectional view of a power takeoff unit of a second embodiment.

With reference to FIG. 6, a PTU 101 according to a second embodiment will be described hereinafter. Any components with the same reference numerals as those described above are substantially the same components. The following descriptions are mainly directed to differences.

The first shaft 3 is comprised of a flange 105 on which the first gear 7, at its contact face 50 at the base portion 8 thereof, abuts. Bolts 103, instead of welding, are used to fix the first gear 7 with the first shaft 3. A back face 107 may be, as with the case of the first embodiment, any of a flat plane, an inclined plane, and a curved surface.

Preferably, the back face 107 is radially inward relative to the fitting portion 57 between the casing main body and the covering body 17, and axially opposes the fitting portion 57. Further preferably, the contact face 49 between the first shaft 3 and the first gear 7 is radially inward relative to the fitting portion 57. Such disposition is advantageous in reduction of the casing 13 in radial size and/or axial size.

As the first gear 7 is produced without a step causing deformation such as welding or press-in, high accuracy can be assured.

Aside from the above effects, the second embodiment enjoys the same effects as those of the first embodiment.

Third Embodiment

Figure 7:
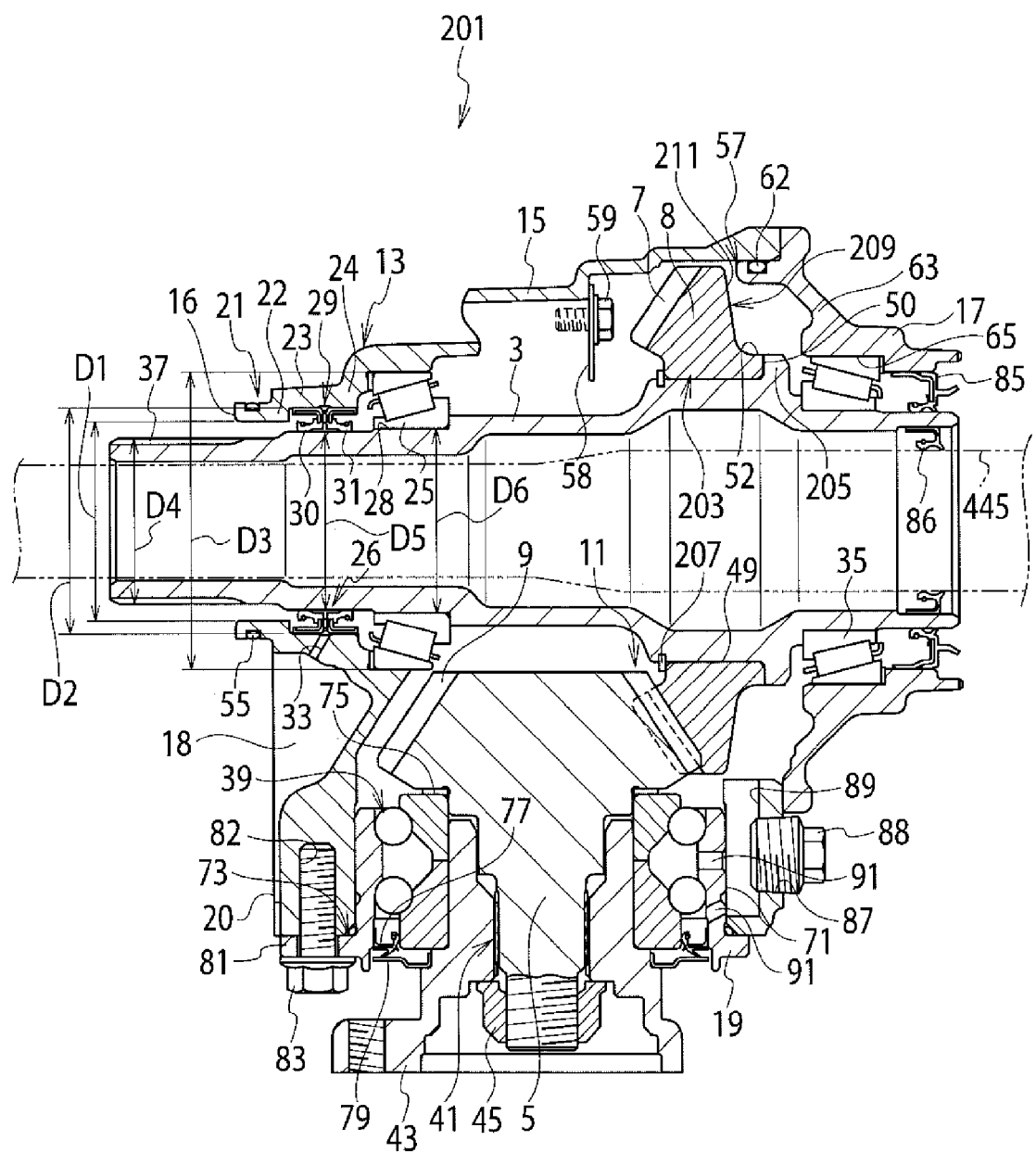
FIG. 7 is a cross sectional view of a power takeoff unit of a third embodiment.

With reference to FIG. 7, a PTU 201 according to a third embodiment will be described hereinafter. Any components with the same reference numerals as those described above are substantially the same components. The following descriptions are mainly directed to differences.

The inner periphery of the first gear 7 is so structured as to establish interference fit with a part 203 where the first gear 7 is combined with the first shaft 3. Such first gear 7 is fixed to the first shaft 3 merely by press fitting. Contact with a flange portion 205 at the contact face 50 and engagement by means of a fixation member 207 put the first gear 7 axially in place. As the fixation member 207, a snap-ring for example is applicable. A back face 209 of the first gear 7 may be a curved surface as shown in the drawing but may be instead a flat plane or an inclined plane.

Preferably, the back face 209 is radially inward relative to the fitting portion 57 between the casing main body and the covering body 17, and axially opposes the fitting portion 57. Further preferably, the contact face 49 between the first shaft 3 and the first gear 7 is radially inward relative to the fitting portion 57. Such disposition is advantageous in reduction of the casing 13 in radial size and/or axial size.

As the first gear 7 is fixed to the first shaft 3 only by press fitting, it gets away from deformation and property deterioration caused by heating as compared with a case of welding, and its production gets easy.

Aside from the above effects, the third embodiment enjoys the same effects as those of the first and second embodiments.

Fourth Embodiment

Figure 8:
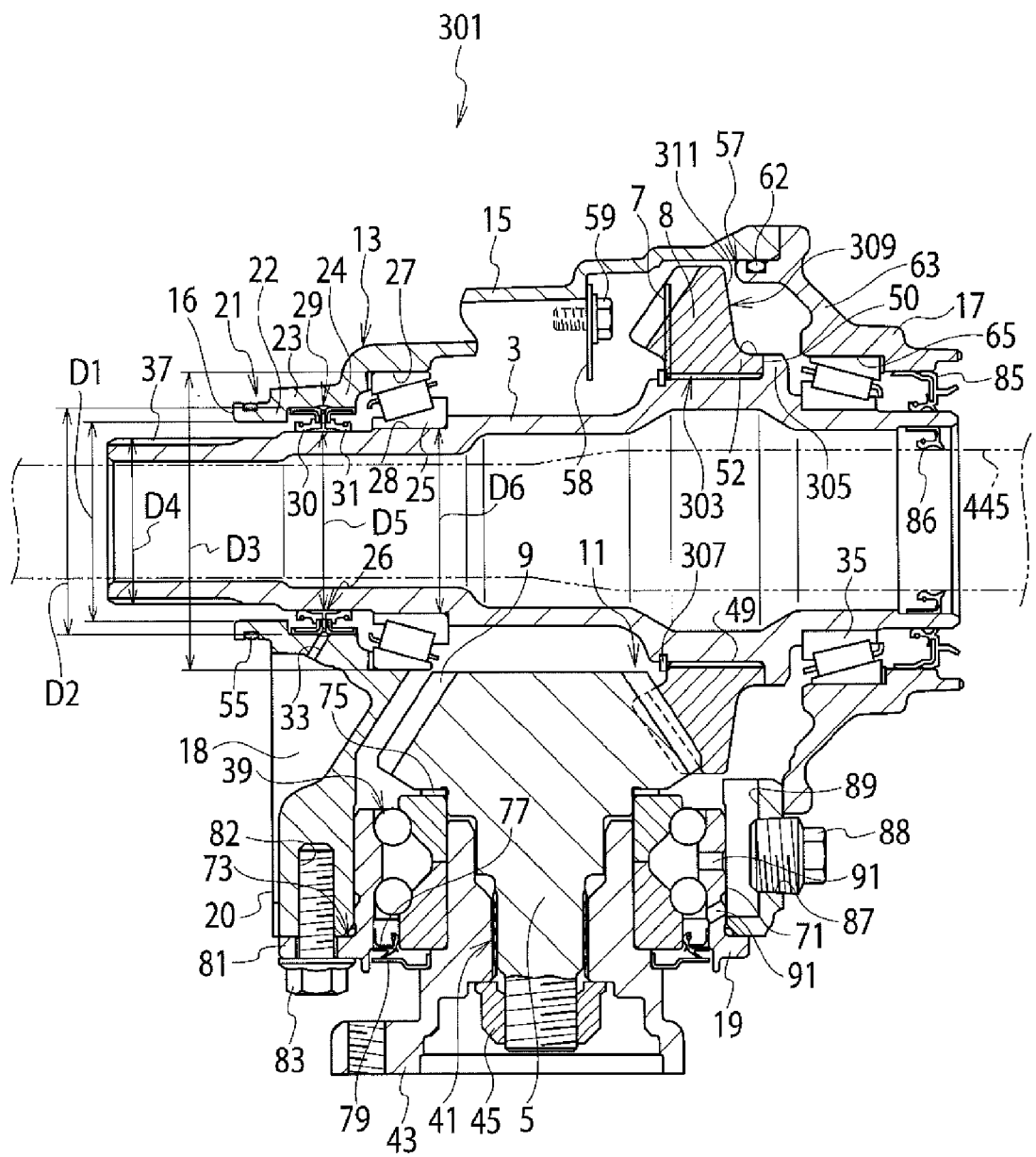
FIG. 8 is a cross sectional view of a power takeoff unit of a fourth embodiment.

With reference to FIG. 8, a PTU 301 according to a fourth embodiment will be described hereinafter. Any components with the same reference numerals as those described above are substantially the same components. The following descriptions are mainly directed to differences.

The first gear 7 is coupled with the first shaft 3 by means of splines. Contact with a flange portion 305 at the contact face 50 and engagement by means of a fixation member 307 put the first gear 7 axially in place. To the fixation member 307 applicable is a snap-ring for example. A back face 309 of the first gear 7 may be a curved surface as shown in the drawing but may be instead a flat plane or an inclined plane.

Preferably, the back face 309 is radially inward relative to the fitting portion 57 between the casing main body and the covering body 17, and axially opposes the fitting portion 57. Further preferably, the contact face 49 between the first shaft 3 and the first gear 7 is radially inward relative to the fitting portion 57. Such disposition is advantageous in reduction of the casing 13 in radial size and/or axial size.

The first gear 7 is fixed to the first shaft 3 only by engaging it with the splines and inserting the fixation member 307. Its production is far easier than that in the other way.

Aside from the above effects, the third embodiment enjoys the same effects as those of the first through third embodiments.

While the above descriptions are directed to a pair of shafts and gears, there may be interposed a third shaft and a third gear, or more elements in addition. Alternatively, the first shaft 3 may be used for output and the second shaft 5 may be used for input.

Various ways of division of the casing 13 may occur. Exemplary is a casing structure comprised of a casing main body of a bag-like shape with an opening at a part around the first shaft in its radial direction for housing the first shaft and the first gear so as to support both ends of the first shaft with bearing caps, a covering body covering the opening, and a bearing support body for supporting the second shaft and being secured with the casing main body. Alternatively exemplary is a casing structure comprised of a case main body housing the first shaft and the first gear and having a semi-circular support portion supporting both ends of the first shaft, a covering body, and a bearing support body secured to the case main body.

Although the invention has been described above by reference to certain exemplary embodiments of the invention, the invention is not limited to the exemplary embodiments described above. Modifications and variations of the embodiments described above will occur to those skilled in the art, in light of the above teachings.

INDUSTRIAL APPLICABILITY

A power takeoff unit enabling a compact transmission is provided.

What is claimed is:

1. A power takeoff unit for an automobile combined with a transmission having an output shaft, comprising:
    a first rotatable shaft of a single unitary body having a first end combinable with the transmission and a second end of which the output shaft of the transmission is led out;
    a first gear as a body separate from the first shaft, the first gear fitting on and being unitarily rotatable with the first shaft and having gear teeth facing the first end;
    a first bearing closer to the first end than the first gear and a second bearing closer to the second end than the first gear, the first bearing and the second bearing fitting directly on the first shaft;
    a second rotatable shaft including a second gear, the second shaft being so disposed as to have the second gear engaged with the first gear and intersecting with, or being not parallel and not intersecting with, the first shaft to establish driving link between the first shaft and the second shaft;
    a casing housing the first gear, the first shaft, the second gear and the second shaft, the casing being configured to link with the transmission and including an attachment portion having a first internal face a first internal diameter and an end portion, and a second internal face being disposed inward than the first internal face relative to the casing and having a second internal diameter;
    a seal member configured to keep oil within the casing and extending from the first shaft to the second internal face;
    wherein the first internal diameter is smaller than the second internal diameter; and
    wherein the casing includes a main body and a covering secured to and detachable from the main body to allow installation of the first gear, the first shaft, the first bearing, and the second bearing into the casing; and
    wherein the main body includes a support portion having a third internal diameter greater than the second internal diameter to allow passage of the seal member; and
    wherein the first bearing is supported on the support portion and the second bearing is supported on the covering.

2. The power takeoff unit of claim 1, wherein the first shaft includes a connection portion configured to link with the output shaft of the transmission, the connection portion having a first external diameter and projecting axially outward from the end portion of the attachment portion, and a sliding portion configured to abut on the seal member, the sliding portion having a second external diameter, and the first external diameter is smaller than the second external diameter.

3. The power takeoff unit of claim 1, wherein the seal member includes a first member and a second member.

4. The power takeoff unit of claim 3, further comprising:
    an opening configured to permit passage of air and opened in between the first member and the second member to communicate with the exterior of the casing.

5. The power takeoff unit of claim 1, wherein the first gear is fixed on the first shaft by means of one selected from the group consisting of press fitting, bolt-tightening, and spline-connection.

6. The power takeoff unit of claim 1, wherein the first shaft includes a flange abutting on the first gear in a direction resisting a thrust load acting on the first gear toward the second end.

7. The power takeoff unit of claim 6, wherein the first gear is welded with the flange to be fixed with the first shaft.

* * * * *